(12) United States Patent
De Bruijn

(10) Patent No.: US 10,575,112 B2
(45) Date of Patent: Feb. 25, 2020

(54) METHOD AND APPARATUS FOR PROCESSING AN AUDIO SIGNAL ASSOCIATED WITH A VIDEO IMAGE

(71) Applicant: KONINKLIJKE PHILIPS N.V., Eindhoven (NL)

(72) Inventor: Werner Paulus Josephus De Bruijn, Utrecht (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/756,607

(22) PCT Filed: Aug. 30, 2016

(86) PCT No.: PCT/EP2016/070343
§ 371 (c)(1),
(2) Date: Mar. 1, 2018

(87) PCT Pub. No.: WO2017/037032
PCT Pub. Date: Mar. 9, 2017

(65) Prior Publication Data
US 2018/0192222 A1     Jul. 5, 2018

(30) Foreign Application Priority Data

Sep. 4, 2015 (EP) .................................... 15183790

(51) Int. Cl.
*H04S 7/00* (2006.01)
*H04N 13/398* (2018.01)
(Continued)

(52) U.S. Cl.
CPC ............. *H04S 7/30* (2013.01); *H04N 13/128* (2018.05); *H04N 13/398* (2018.05);
(Continued)

(58) Field of Classification Search
CPC .............. H04N 13/161; H04N 19/597; H04N 2013/0081; H04R 2499/15
(Continued)

(56) References Cited

U.S. PATENT DOCUMENTS

| | | |
|---|---|---|
| 2012/0002024 A1 | 1/2012 | Choi et al. |
| 2013/0010969 A1 | 1/2013 | Cho et al. |

(Continued)

FOREIGN PATENT DOCUMENTS

| | | |
|---|---|---|
| EP | 2458895 A2 | 5/2012 |
| EP | 2475193 A1 | 7/2012 |

(Continued)

OTHER PUBLICATIONS

Simone, F et al., "Design, Coding and Processing of Metadata for Object-Based Interactive Audio", AES Convention 137, Oct. 2014, New York, Oct. 2014.

(Continued)

*Primary Examiner* — Alexander Krzystan

(57) ABSTRACT

An audio signal processing apparatus includes a receiver which receives an audio signal including audio data for at least a first audio object associated with a three dimensional image. The audio signal also includes depth position data indicative of a target depth position for the first audio object. A determiner determines a visual rendering depth range for a target three dimensional display for presenting the three dimensional image, and a mapper for mapping the target depth position to a rendering depth position for the audio object where the mapping is dependent on the visual rendering depth range. The visual rendering depth range may specifically be a depth range in which the three dimensional display can accurately render objects, and the mapper may amend the positions of audio object sound sources such that (Continued)

these match the depth positions of corresponding visual objects presented by the three dimensional display.

17 Claims, 4 Drawing Sheets

(51) Int. Cl.
*H04N 13/128* (2018.01)
*H04N 13/00* (2018.01)

(52) U.S. Cl.
CPC .. *H04N 2013/0081* (2013.01); *H04R 2499/15* (2013.01); *H04S 2400/11* (2013.01)

(58) Field of Classification Search
USPC .......................................... 381/306; 348/43
See application file for complete search history.

(56) References Cited

U.S. PATENT DOCUMENTS

| | | | |
|---|---|---|---|
| 2013/0314497 A1 | 11/2013 | Tsuchida | |
| 2014/0301463 A1* | 10/2014 | Rusanovskyy | H04N 19/52 375/240.14 |
| 2015/0181192 A1* | 6/2015 | Jeong | H04N 21/816 348/42 |
| 2015/0296319 A1* | 10/2015 | Shenoy | H04S 7/302 381/303 |
| 2016/0133041 A1* | 5/2016 | Han | G06T 15/40 345/419 |

FOREIGN PATENT DOCUMENTS

| | | |
|---|---|---|
| EP | 2871842 A1 | 5/2015 |
| JP | 2011035784 A | 2/2011 |
| JP | 2012160984 A | 8/2012 |
| WO | WO-2014161989 A1 * 10/2014 | ........... H04N 19/597 |

OTHER PUBLICATIONS

Trivi, J. et al., "Use of a 3-D Positional Interface for the Implementation of a Versatile Graphical Mixing Console", An Audio Engineering Society Preprint, AES 107th Convention, Sep. 1999.

Ludé, P. et al., "SMPTE Standards Update: Immersive Sound for Cinema", SMPTE, Professional Development Academy, www.smpte.org, 2014.

DTS-MDA [ETSI document TS 103 223], v1.1.1, "The Multi-dimensional audio (MDA) content creation format specification with extensions for consumer environments", 2015.

* cited by examiner

METHOD AND APPARATUS FOR PROCESSING AN AUDIO SIGNAL ASSOCIATED WITH A VIDEO IMAGE

CROSS-REFERENCE TO PRIOR APPLICATIONS

This application is the U.S. National Phase application under 35 U.S.C. § 371 of International Application No. PCT/EP2016/070343, filed on 30 Aug. 2016, which claims the benefit of European Patent Application No. 15183790.3, filed on 4 Sep. 2015. These applications are hereby incorporated by reference herein.

FIELD OF THE INVENTION

The invention relates to a method and apparatus for processing an audio signal and in particular, but not exclusively, to processing of a three dimensional audio signal for presentation with an associated three dimensional video.

BACKGROUND OF THE INVENTION

The rendering of audio has become increasingly varied and a range of rendering approaches and user experiences have been introduced. For example, spatial audio as part of an audio visual experience has become widespread, in particular in the form of surround sound. In such systems, an image or video is presented with an associated spatial audio environment being created.

In order to support the variation and flexibility in spatial audio rendering, a number of formats for representing spatial audio have been developed.

A recent format is the MPEG Surround format. However, although this provides a suitable format for many applications it is still not as flexible as desired for other applications. For example, audio is still produced and transmitted for a specific loudspeaker setup, e.g. an ITU 5.1 loudspeaker setup. Reproduction over different setups and over non-standard (i.e. flexible or user-defined) loudspeaker setups is not specified.

In order to provide for a more flexible representation of audio, formats are being developed that represent individual audio sources as individual audio objects. Thus, rather than represent an audio scene by audio channels corresponding to specific (nominal or reference) positions, it has been proposed to provide individual audio objects which each represent a specific audio source (including e.g. background, diffuse and ambient sound sources). Typically, the audio objects may be provided with (optional) position information which indicates a target position of the audio object in the sound stage. Thus, in such approaches, an audio source may be represented as a separate and single audio object rather than by the contribution it makes to audio channels associated with specific, predetermined positions.

In order to support such an approach, MPEG has standardized a format known as 'Spatial Audio Object Coding' (ISO/IEC MPEG-D SAOC). In contrast to multichannel audio coding systems such as DTS, Dolby Digital and MPEG Surround, SAOC provides efficient coding of individual audio objects rather than audio channels. Whereas in MPEG Surround, each loudspeaker channel can be considered to originate from a different mix of sound objects, SAOC allows for interactive manipulation of the location of the individual sound objects in a multi channel mix.

Similarly to MPEG Surround, SAOC also creates a mono or stereo downmix. In addition, object parameters are calculated and included. At the decoder side, the user may manipulate these parameters to control various features of the individual objects, such as position, level, equalization, or even to apply effects such as reverb.

SAOC allows a more flexible approach and in particular allows more rendering based adaptability by transmitting audio objects in addition to only reproduction channels. This allows the decoder-side to place the audio objects at arbitrary positions in space, provided that the space is adequately covered by loudspeakers. This way there is no relation between the transmitted audio and the reproduction or rendering setup, hence arbitrary loudspeaker setups can be used. This is advantageous for e.g. home cinema setups in a typical living room, where the loudspeakers are almost never at the intended positions. In SAOC, it is decided at the decoder side where the objects are placed in the sound scene. However, whereas rendering side manipulation of audio objects are supported, it is typically desired that the audio can be rendered without requiring user inputs while still providing a suitable sound stage. In particular, when the audio is provided together with a linked video signal, it is desired that the audio sources are rendered at positions corresponding to the positions in the image. Accordingly, audio objects may often be provided with target position data which indicates a suggested rendering position for the individual audio object.

Other examples of audio object based formats include MPEG-H 3D Audio [ISO/IEC 23008-3 (DIS): Information technology—High efficiency coding and media delivery in heterogeneous environments—Part 3: 3D audio, 2014.], ADM [EBU Tech 3364 "Audio Definition Model Ver. 1.0", 2014] and proprietary standards such as Dolby Atmos [SMPTE TC-25CSS10 WG on "Interoperable Immersive Sound Systems for Digital Cinema", 2014] and DTS-MDA [ETSI document TS 103 223, "The Multi-Dimensional Audio (MDA) Content Creation Format Specification with Extensions for Consumer Environments", 2014].

The concept of object-based audio production and reproduction offers many advantages over the traditional channel-based approach. In particular, the possibility to assign a specific position in space to individual sound objects offers a large degree of flexibility, scalability and new possibilities for interactivity.

If suitable audio rendering techniques are used, object-based audio enables positioning an object in a perceptually realistic way at any position in 3D space, including accurate localization of azimuth, elevation and distance relative to the listener. Some examples of such rendering techniques are: binaural headphones reproduction, transaural loudspeaker reproduction, Wave Field Synthesis loudspeaker reproduction and, to some extent, VBAP loudspeaker reproduction.

Typically, object-based audio content is presented together with corresponding video content rendered on a video display. If an audio object corresponds to a visual object that is present on the screen, it is usually desirable that there is some spatial synchronization or congruency between the perceived auditory- and visual object positions, i.e. that the sound and image of the object match in space. If such synchronization is absent, i.e. if the perceived positions of the auditory- and corresponding visual object are significantly different, this may be confusing to the user and degrade the overall perceived quality or immersion of the audio-visual presentation.

However, as the rendering setups, and especially the video rendering setups, typically vary substantially, it can be difficult to achieve tight spatial synchronization and this may in many situations result in a degraded user experience. In particular, the capabilities and rendering characteristics of different displays may vary substantially and this may cause different rendering in different scenarios.

Hence, an improved approach for processing spatial audio signals for rendering would be advantageous, and in particular an approach allowing increased flexibility, facilitated operation, reduced complexity and/or resource demand, improved spatial synchronization to associated video and/or an improved user experience would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio signal processing apparatus comprising: a receiver (101) for receiving an audio signal comprising audio data for at least a first audio object representing an audio source in a scene visually represented by a three dimensional image, the audio signal further comprising depth position data indicative of a first depth position for the first audio object; a determiner (107) for determining a depth rendering property for a first three dimensional display for presenting the three dimensional image, the depth rendering property indicating a visual rendering depth range of the first three dimensional display; a mapper (109) for mapping the first depth position to a rendering depth position for the first audio object; the mapping being dependent on the visual rendering depth range.

The invention may allow an improved user experience when rendering audio objects together with a three dimensional image. Specifically, a scene may be presented as an audiovisual rendering of a three dimensional image (or set of images providing a three dimensional video sequence) and audio corresponding to audio sources in the scene. The combined video and audio presentation may provide an improved user experience and the approach of mapping the positions of the audio objects may result in an improved spatial synchronization and specifically in a closer coherence between the audio and visual perceptions of the viewer.

The inventors have realized that in particular three dimensional displays may vary substantially in rendering capabilities and may specifically have very different depth rendering properties. The inventors have further realized that such depth rendering variations may result in significant variations in the perceived user experience. In particular, they have realized that the perceptual effect of depth rendering variations on the perceived spatial synchronization between audio and video is substantial and can result in a significantly degraded audiovisual user experience. They have further realized that this may be mitigated and/or alleviated by applying a remapping to audio object depth positions which is dependent on the spatial depth rendering characteristics of the display.

The mapping may provide a rendering depth position as a function of a first depth position, which will also be referred to as a target depth position. The first three dimensional display will also be referred to as the target (three dimensional) display. The mapping function may be determined in response to the visual rendering depth range indicated by the depth rendering property. The function may in many embodiments be a monotonic function, i.e. the mapping may provide the rendering depth position as monotonic function of the target depth position.

The first/target depth position may provide a suggested position for the rendering of the first audio object. It may specifically be a nominal position for the rendering of the audio object. The nominal position may be an optional position for the rendering, and the renderer may accordingly change this position. The suggested position may for example be generated and determined as part of the content production, for example when capturing a scene. Thus, the audio signal may comprise data which suggests a depth at which the first audio object should be rendered. It will be appreciated that the position data may typically also comprise position information which allows non-depth positions to be determined, such as an x or y position (with the depth position being represented as a z-position) or an azimuth and elevation position. In many embodiments, the target depth position may be provided as part of a target position indicating a three dimensional target position for the first audio object.

It will be appreciated that any suitable reference may be used for the depth positions. For example, in many embodiments, depth positions may be referenced relative to the screen level depth, and specifically may be reference to a depth position corresponding to there being no disparity between the display (x,y) positions in images for different viewing angles, i.e. for respectively the right and left eye views.

The rendering depth position may similarly be part of a target rendering position indicating an intended three dimensional rendering position for the first audio object. The rendering depth position may be considered a modified target position, and may thus be a modified target position for a rendering of the first audio object. The rendering depth position provides an indication of a depth position from where the first audio object should be perceived to originate when rendered by a spatial audio renderer. The rendering depth position may be a second depth position generated by the mapping of the first depth position. It may specifically be a modified optional, nominal position for the first audio object.

The target three dimensional display may be any display suitable for rendering/presenting a three dimensional image including for example autostereoscopic displays or stereoscopic displays using e.g. synchronized glasses for providing a three dimensional experience. The target three dimensional display is the display for which the mapping is performed and may correspond to a display which is assumed to be used for the rendering of the three dimensional image. Thus, if the three dimensional image is presented by the target three dimensional display and the first audio object is rendered at a position corresponding to the rendering depth position, a closer correspondence between the perceived audio and visual depth positions can be achieved. Indeed, the approach may spatially link or synchronize the visual and audio domains. For example, the visual position of an image object corresponding to a sound source represented by the first audio object may be closer aligned with the position of the audio when the first audio object is rendered.

The depth rendering property comprises a visual rendering depth range which is indicative of the rendering of depth by the three dimensional display. It may in many embodiments be indicative of a depth rendering capability of the three dimensional display, such as for example a usable depth range. For example, the visual rendering depth range may indicate a range (possibly only in front of or behind the three dimensional display) in which the three dimensional display is able to render image parts without this resulting in unacceptable fatigue, quality degradation, blur etc. The range may often be given as a physical range (in real space), e.g. measured in meters (or any other distance measure).

The determiner may e.g. be any controller, processor, unit, process, sub-entity etc. which is capable of determining a depth rendering property, including e.g. by receiving or retrieving appropriate data from an external source or memory.

The mapper may e.g. be any controller, processor, unit, process, sub-entity etc. which is capable of determining a rendering depth position from a target depth position, i.e. it is capable of mapping data indicating a first position to data indicating a second position. The mapper may include an adapter for adapting/modifying the mapping in response to the visual rendering depth range.

In some embodiments, the audio processor may comprise a renderer for rendering the first audio object in response to the rendering depth position. The rendering may render the first audio object to be perceived from a position corresponding to the rendering depth position (specifically such that a nominal listener at a nominal position will perceive the first audio object to be at the rendering depth position).

In many embodiments, the first audio object may represent audio for an image object of a three dimensional image. Thus, in many embodiments, the first audio object may provide audio for a specific image object that may specifically be visible in the three dimensional image. However, in other scenarios, the first audio object may provide a description for an audio source in the scene which does not directly correspond to an image object. E.g. it may provide audio data describing an audio source from an entity that is not directly visible in the image, e.g. due to being too small or being occluded.

In accordance with an optional feature of the invention, the audio signal further comprises an indication of a depth rendering property for a second display for the three dimensional image; and wherein the mapper is arranged to adapt the mapping in response to the depth rendering property for the second display.

This may allow an improved user experience in many scenarios and embodiments, and may specifically provide improved spatial synchronization between audio and video. The second display, which will also be referred to as the reference display, may typically be a production display or a nominal display for the three dimensional image. The reference display may be a display assumed to be used for rendering by the source or content production side. The target depth position for the first audio object may correspond to a depth position at which a corresponding image segment of the three dimensional image is rendered if this rendering is using a display with the same properties as the reference display. The depth rendering property for the reference display may specifically be a reference depth rendering range.

In accordance with an optional feature of the invention, the mapping is a monotonic mapping of a visual rendering depth range for the second display to the visual rendering depth range for the first three dimensional display.

This may provide an improved user experience while maintaining low complexity in many embodiments. The mapping may provide the rendering depth position as a monotonic function of the target depth position. The mapping may be a linear or piecewise linear mapping of the target depth position to the rendering depth position.

The depth rendering property comprises an indication of a rendering depth range of the target three dimensional display.

This may provide a particularly efficient and useful depth rendering property in many applications. The depth rendering range may provide particularly advantageous information for adapting positions to provide improved spatial synchronization. The rendering depth range may indicate a range in physical space relative to the three dimensional display. The range may be indicated in e.g. meters or a corresponding measure of length. The rendering depth range may specifically be provided for objects in front of the screen and may indicate a range in which image segments are considered to be rendered with sufficient quality and without causing undesired effects to the viewer (such as fatigue).

In accordance with an optional feature of the invention, the mapper is arranged to map the first depth position differently for the visual rendering depth range indicating a first visual rendering depth range for the three first dimensional display having a first display size and for the visual rendering depth range indicating a second visual rendering depth range for the first three dimensional display having the first display size, the first visual rendering depth range being different from the second visual rendering depth range.

Different displays having the same display size may have different visual rendering depth ranges. The mapper may be arranged to map the first position differently for such displays, i.e. the mapper may be arranged to map the first position differently for displays having the same display size but different visual rendering depth ranges. The depth range for a display may be dependent on a variety of properties including e.g. the resolution/pixel size, the number of views generated, the quality of the optical components, properties of view forming elements etc. Thus, even for displays having the same display size, the supported operational depth range may be different and this may be reflected by the mapping.

The mapper may be arranged to map the first position differently for a same display size for the first three-dimensional display but for the visual depth rendering property indicating different visual depth rendering ranges.

In accordance with an optional feature of the invention, the mapping is asymmetric around a screen depth level, the screen depth level corresponding to a zero disparity (between left and right eye views).

This may provide improved performance in many embodiments. In particular, the mapping may be different in front of and behind the screen/display. The mapping may specifically reflect differences in the rendering capability of the three dimensional display for image segments rendered in-front respectively behind the display/screen plane of the three dimensional display. In many embodiments, the mapping may be arranged to only modify depth values in front of a display plane depth.

The screen depth level corresponds to the depth for which there is no disparity in the pixel position between different views (intended for the different eyes), i.e. it corresponds to the depth perceived to be at the screen level (and not in front or behind the screen).

In accordance with an optional feature of the invention, the mapping is a non-linear mapping.

This may provide improved performance in many embodiments. In particular, the mapping may include mapping the target depth position such that a distance from the display plane depth to the rendering depth position is limited to not exceed a maximum value.

In accordance with an optional feature of the invention, the audio signal includes a flag for the first audio object indicating whether the audio object is a screen related audio object or not, a screen related audio object being an audio object for which a rendering process is dependent on a visual rendering property of the first three dimensional display; and wherein the mapper (109) is arranged to apply the mapping to the first depth position of the first audio object only if the flag indicates that the at least one audio object is a screen related audio object.

This may allow improved processing in many embodiments and may specifically provide an efficient approach for supporting different types of audio. The approach may provide for improved audio rendering which may be adapted to reflect the visual rendering of a corresponding image. In particular, it may allow a closer correlation between the rendered audio and video.

In accordance with an optional feature of the invention, the audio signal processing apparatus further comprises a converter for generating the three dimensional image from a plurality of two dimensional images, the generating of the three dimensional image comprising determining a depth map for the three dimensional image; and wherein the determiner is arranged to determine the depth rendering property in response to the depth map.

This may provide a particularly efficient system, and in particular a particularly efficient way of generating a depth rendering property suitable for adapting the mapping of audio objects.

In accordance with an optional feature of the invention, the audio signal processing apparatus further comprises display data indicative of the depth rendering property and the determiner is arranged to extract the display data and determine the depth rendering property in response to the display data.

This may provide a particularly efficient approach for providing the depth rendering property to the audio processor in many embodiments and may in particular facilitate interfacing to other functionality.

In accordance with an optional feature of the invention, the audio signal processing apparatus further comprises a selector arranged to select a subset of a three dimensional scene represented by the three dimensional image for presentation on a full display area of the first three dimensional display; and wherein the mapper is arranged to adapt the mapping in response to a depth property of the subset.

This may provide an attractive user experience and added flexibility in rendering while providing an attractive degree of spatial synchronicity. The approach may in particular allow a closer correspondence between a rendered audio stage and a presented image as e.g. a user zooms in and out of a scene.

In accordance with an optional feature of the invention, the mapper is arranged to adapt the mapping to be a monotonic mapping of a visual rendering depth range of the subset to a rendering depth range for the first three dimensional display.

This may provide particularly efficient operation and/or advantageous performance in many embodiments. The visual depth range may be a depth range of image components, such as image objects, within the subset. The visual depth range may specifically be, or be indicative of, a range of disparities or depth values within the subset.

In accordance with an optional feature of the invention, the target or first depth position for the first audio object is outside the subset.

This may provide particularly efficient operation and/or advantageous performance in many embodiments.

According to an aspect of the invention there is provided a method of processing an audio signal, the method comprising: receiving an audio signal comprising audio data for at least a first audio object representing an audio source in a scene visually represented by a three dimensional image, the audio signal further comprising depth position data indicative of a target or first depth position for the first audio object; determining a depth rendering property for a first three dimensional display for presenting the three dimensional image, the depth rendering property indicating a visual rendering depth range of the first three dimensional display; mapping the first depth position to a rendering depth position for the first audio object; the mapping being dependent on the visual rendering depth range.

According to an aspect of the invention there is provided audio signal comprising: audio data for at least a first audio object representing an audio source in a scene visually represented by a three dimensional image, depth position data indicative of a first depth position for the first audio object, a flag for the first audio object indicating whether the audio object is a screen related audio object or not, a screen related audio object being an audio object for which a rendering process is dependent on a visual rendering property of a three dimensional display; and display data comprising a depth rendering property for the three dimensional display for the three dimensional image, the depth rendering property indicating a visual rendering depth range of the three dimensional display.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a system for rendering spatial audio in connection with presentation of an associated three dimensional video on a three dimensional display. However, it will be appreciated that the invention is not limited to this application but may be applied to many other implementations, systems, and products including for example presentation of still images or audio data decoding and transcoding.

Figure 1:
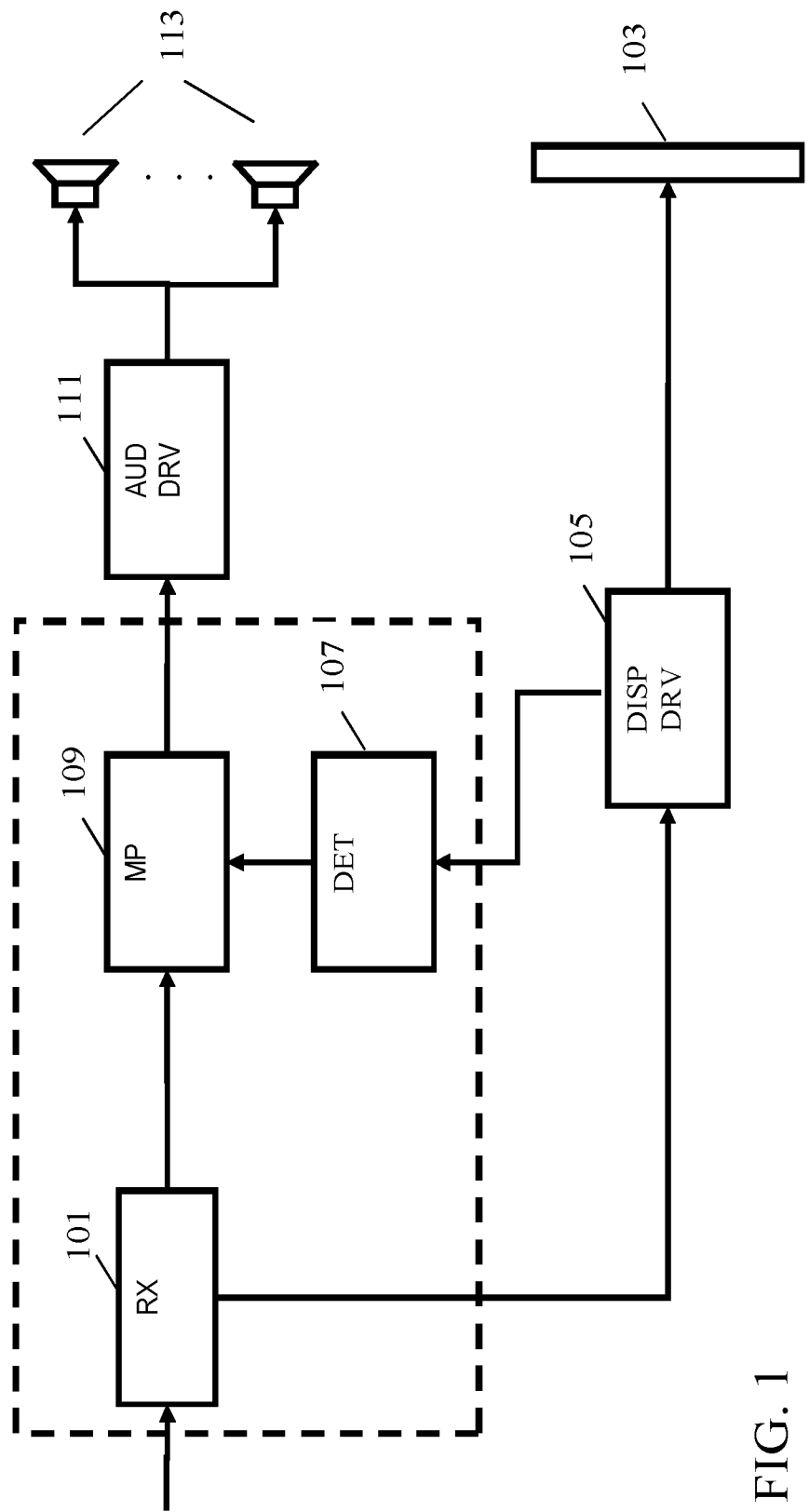
FIG. 1 is an illustration of an example of an audiovisual rendering system comprising an audio signal processing apparatus in accordance with some embodiments of the invention.

FIG. 1 illustrates an audiovisual rendering system comprising an audio signal processing apparatus in accordance with some embodiments of the invention.

The audiovisual rendering system and audio signal processing apparatus comprises a receiver 101 arranged to receive a digital audiovisual signal which comprises audio data and video data. The video data includes data representing at least one 3D image and in the specific example video data is included which represents frames of a 3D video stream.

In the system of FIG. 1, the 3D video stream is presented on a 3D display 103.

The 3D video data is fed to a display driver 105 which generates a suitable drive signal for the 3D display to cause the 3D images to be presented. For example, the 3D display 103 may be a complete display, such as a standard 3D computer monitor or TV, and the display driver 105 may provide suitably encoded video data to the 3D display 103. For example, in some embodiments, the display driver 105 may simply receive video data from the receiver 101 and forward this to the 3D display 103 in a suitable format. In some embodiments, the display driver 105 may simply provide a direct electrical and/or mechanical interface that directly controls individual pixels of the 3D display 103. In some embodiments, the display driver 105 may include a transcoding function. In some embodiments, the 3D display 103 may simply be a 3D display panel which is driven directly by the display driver 105. For example, the display driver 105 may in some embodiments be arranged to decode the video data and generate suitable drive values for individual pixels of the 3D display 103. This may for example be the case for embodiments wherein the entire audiovisual rendering system of FIG. 1 is implemented in a single display device, such as in a television. In such cases, the 3D display 103 may represent the display panel.

It will be appreciated that many different types of three dimensional displays are known and that any suitable approach for providing a visual 3D rendering may be used. Specifically, 3D displays may add a third dimension to the viewing experience by providing a viewer's two eyes with different views of the scene being watched. This can be achieved by having the user wear glasses to separate two views that are displayed. However, as this is relatively inconvenient to the user, it is in many scenarios desirable to use autostereoscopic displays that directly generate different views and project them to the eyes of the user.

In addition to the video data, the audiovisual signal also comprises audio data which represents the audio associated with the video data. The audio data may thus provide an audio description of the scene for which the video data provides a visual description. Therefore, the audio data may comprise data for audio intended to be presented together with the presentation of the video stream.

In the example, the audio data may include audio data specifying a number of different audio objects for various audio sources in the scene. Some of these audio objects may be diffuse or general sounds that are not associated with any specific positions. For example, one or more audio objects may be ambient or background audio objects that represent background or ambient sounds. However, other audio objects may be associated with specific sound sources corresponding to specific positions in the sound stage. Accordingly, the audiovisual signal may also comprise position data which provides indications of desired positions for specific audio objects, i.e. it may include target position data for the audio objects.

Thus, the audio signal comprises audio data for at least one (but typically more) audio source in a scene. Further, the scene is also visually represented by a 3D image and thus the audio object is associated with a 3D image that represents the same scene.

In some scenarios, one or more audio objects may be associated with specific image objects. For example, an audio object may correspond to speech from a human in the image. This audio object may thus be associated with an image object corresponding to the human, or more specifically (e.g. for close ups) the mouth of the human. The audiovisual signal may in such an example comprise audio data that describes the speech and position data that indicates the position of the corresponding image object in the 3D image (i.e. the speaker (or mouth of the speaker)). Thus, in many embodiments or scenerios, at least a first audio object of the received audio signal represents audio for an image object of the three dimensional image. Thus, the image provides a visual representation of an object in the scene and the first audio object may provide an audio representation of this object.

For other audio objects, the association to the three dimensional image may not be an association to a specific image object but may relate more indirectly to the scene represented by the 3D image. For example, the audio may originate from an audio source that is not visible in the rendered image (e.g. due to occlusion, distance or size). As a specific example, the first audio object may provide a description of a bird singing in a landscape scene which is also visually represented by the 3D image. However, the bird itself may not be visually represented in the image, e.g. because it will simply be too small to be seen in the landscape.

It should be appreciated that the term image object may refer to any part, region, segment, area or entity in a three dimensional image, and that this may not be explicitly identified or characterized as a separate object. For example, a 3D image may be received as a left and right eye images that are presented to a user without any identification of the content except for the pixel values. However, various groups of pixels that correspond to an entity or part of an entity in the scene may be considered image objects. Thus, the term image object may simply be considered to correspond to a part of the image (typically having similar characteristics or belonging to the same object of the scene).

However, it will also be appreciated that in some embodiments, some or all of the 3D image may be provided as separate, individual objects that are to be rendered, and with the 3D image being formed by the combined rendering of these individual objects. Such objects may also be considered to be image objects but the described approach is clearly not limited to such implementations.

The position data may allow the rendering of the audio object to be positioned at the desired position such that it matches that of the speaker in the image. Furthermore, in the specific case where the video is a 3D video stream which is rendered by a 3D display 103, the position information does not only comprise information about azimuth and elevation (or position in the plane of the display, henceforth referred to as the x (for horizontal) and y (for vertical) directions). Rather, the position data for at least the first audio object comprises information of the position in the depth direction (also referred to as the z-direction which is perpendicular to the plane formed by the display panel). Thus, the position data may comprise depth position data indicative of a target depth position for the first audio object (the target depth position may e.g. be provided as a z-value of a set comprising x,y,z position values).

It will be appreciated that whereas the description for brevity and clarity will focus on the processing for one audio object, referred to as the first audio object, the audio data will typically provide data for a relatively large number of audio objects to be simultaneously rendered, including both audio objects for which specific position data is provided as well as e.g. ambient or background audio objects that are not associated with any specific position. The position data for a first audio object includes a first depth position, also henceforth referred to as the target depth position. This may specifically be data defining a depth value for the first audio object (with respect to any suitable reference as will be well known in the art, e.g. using the display plane/screen level depth as a reference although any other suitable reference can be used).

The depth information allows the audio object to be positioned not only at the appropriate azimuth and elevation but also at an appropriate depth. For example, the audio corresponding to the speaking human may be positioned at a depth that corresponds to the distance of the image object of the speaking human to the viewer.

However, positioning an audio source appropriately to match an associated three dimensional image is particularly challenging for a 3D display, and in particular it is challenging for the depth direction. Indeed, whereas a suitable rendering position for an audio object corresponding to a given position in the x and y direction is relatively easy, the human perception of audio depth cues is substantially more complex. In particular, whereas the determination of a suitable position in the x, y plane is typically merely a case of simple linear analytical geometry, human depth perception of depth cues from a 3D display is more complex and typically cannot be sufficiently accurately determined by mere linear geometric analysis.

The inventors have realized that accordingly the rendering of audio to match a three dimensional rendering of an associated 3D image is highly dependent on the specific depth rendering characteristics of that display.

In more detail, 3D displays are limited in their ability to render visual distance of visual objects. In practice, there is a maximum depth range relative to the display plane in which visual objects can effectively be rendered. The depth range in front of the display (between the display and the user) may in particular be limited in practice. Objects whose distance from the display plane exceeds this range are perceived as being distorted, or are uncomfortable to view. Accordingly, in many 3D video systems a limitation is typically imposed on the rendering distance of visual scenes or objects, such that the rendered depth range does not exceed the capabilities of the screen.

This limitation of the depth rendering of visual scenes is typically carried out independently from the rendering of the corresponding audio objects, which may therefore effectively be rendered at a different distance from the user as the corresponding visual object, leading to an audio-visual spatial asynchrony. Further, as the depth rendering capability may vary substantially between different displays, it is not possible to generate a source signal which is suitable for all 3D displays.

This issue may be mitigated by the approach of FIG. 1 where the audiovisual rendering system further comprises functionality for mapping the received target depth positions for audio objects into rendering positions that are dependent on the depth rendering properties (and specifically depth rendering capabilities) of the 3D display 103. Thus, the audio rendering position is determined in consideration of the visual depth capabilities of the display. Specifically, the remapping of the depth position of audio objects may be used to achieve an improved perceived spatial synchrony. Specifically, the audio processor of FIG. 1 comprises functionality for transforming or mapping a depth position (e.g. a distance parameter, disparity value, or direct z-axis value) received for an audio object into a rendering depth position dependent on the depth rendering characteristics of the 3D display 103. The depth rendering characteristics of a display will influence the actual rendering depth of various parts of the image and the mapping may specifically transform the positions of the audio objects such that they correspond to the expected perceived visual distance for the corresponding visual object on the screen of the 3D display 103.

In more detail, the audio processor comprises a display property determiner/processor 107 which is arranged to determine a depth rendering property for a target three dimensional display for presenting the three dimensional image, i.e. in the specific example for the 3D display 103.

The depth rendering property may specifically be an indication of a depth rendering capability of the 3D display 103. For example, the display property determiner 107 may determine the depth range in which the 3D display 103 can represent image objects. The depth range may be provided as a physical distance in the rendering environment in which the display can render image objects, i.e. as a physical range (e.g. measured in meters) in which the 3D display 103 can generate visual depth cues resulting in a viewer perceiving the object to be at the intended position.

The depth rendering property indicates (or indeed may be) a visual rendering depth range for the 3D display, The visual rendering depth range may indicate an operational depth range for 3D display. Thus, the visual rendering depth range may describe a depth range in which the properties of the display allow positions of image objects to be displayed. The visual rendering depth range may be a depth interval supported by the capabilities/characteristics/properties of the display. It will be appreciated that the exact criterion or requirements for selecting or determining the end-points of a such a range will depend on the preferences and requirements of the individual embodiment. Thus, the visual rendering depth range may be determined (e.g. during the manufacturing or design phase) to reflect an allowable depth range in which a rendering of image objects will meet a quality criterion. The exact criterion may be different for different embodiments and scenarios.

As an example, in some embodiments, a visual rendering depth range may be determined manually by an engineer during the manufacturing or design process. The resulting depth range may be hard coded (i.e. stored) in the 3D display. In such scenarios, the determiner 107 may determine the visual rendering depth range by communicating with a 3D display in order to receive data defining the visual rendering depth range for the specific display. The visual rendering depth range may thus reflect an inherent property of the 3D display, and specifically may reflect the 3D displays ability to render depth. The visual rendering depth range will thus typically be the result of a number of different parameters and properties of the display including e.g. the screen size, the resolution, the optical properties of the display, geometric properties of the display etc.

In many embodiments, the display property determiner 107 may be coupled to the display driver 105 (and/or the 3D display 103) and may directly receive data which indicates the rendering capabilities of the display. Such data may e.g. be determined during the design phase for a 3D display 103 and included in the display driver 105 (or 3D display 103) during the manufacturing phase. In other embodiments, the display property determiner 107 may receive indirect indications that allow a visual rendering depth range to be determined. For example, the display property determiner 107 may be provided with information indicating properties that affect the appropriate depth range for the display, such as for example information on the resolution, geometric properties of e.g. a lenticular screen, display size, etc.

As a specific example, a display property that impacts the depth rendering capabilities of the display is the display's nominal viewing distance, which is mainly related to the display size and pixel resolution (but depends integrally on both of these). In viewing a stereoscopic image, the illusion of depth is obtained by introducing a disparity between the images that are intended for the left and right eye, i.e. the images for the left and right eye are projected at laterally displaced positions on the display. For a visual target behind the display, the disparity is positive, i.e. the image for the left eye is projected to the left of the image for the right eye. For a visual target at the display plane, the disparity is zero, and both images coincide. For a visual target in front of the display, the disparity is negative, i.e. the image for the left eye is displayed to the right of the image for the right eye, and hence the user has to "cross" his eyes. If this negative disparity, in terms of the angle between the viewing directions of the eyes, becomes too large, this introduces discomfort and fatigue. For a display with a smaller nominal viewing distance, this limit of tolerable negative disparity will be reached for a smaller absolute target distance in front of the screen than for a display with a larger nominal viewing distance.

In addition, the type of stereoscopic display technology that is employed may influence the maximum depth range that can be rendered comfortably and/or with sufficient quality (i.e. without too strong blurring or "ghosting" artefacts). For example, the usable depth range for an autostereoscopic lenticular display may be different than for a stereoscopic display with active shutter glasses, which in turn may have a different useable depth range than a stereoscopic display with passive (e.g. polarized) glasses.

The display property determiner 107 is coupled to a mapper 109 which is further coupled to the receiver 101 from which it receives audio data and target position data for one or typically more audio objects. The mapper 109 is arranged to perform a mapping of the target depth position of a received audio object to a rendering depth position. Thus, the mapper 109 may change the z-value for the first audio object to a different value which may then be used for the rendering of the first audio object. The mapping is dependent on the visual rendering depth range which is received from the display property determiner 107 and thus the mapping is dependent on the depth rendering characteristics of the 3D display 103.

Specifically, the mapping may be such that the depth position resulting from the mapping will correspond to a depth position of a corresponding image object in the 3D image when this is presented on the 3D display 103. The positions may be matched in the rendering space, i.e. in actual physical space.

In some embodiments, the mapping performed by the mapper 109 may be generated to correspond to a mapping between depth values for the 3D image and a perceived depth distance (e.g. relative to the screen level) when rendered on the 3D display 103. Specifically, the depth rendering property may in some embodiments reflect a mapping between image object depth values and corresponding perceived depth positions when the image objects are rendered by the 3D display 103. The mapping performed by the mapper 109 may then perform a corresponding mapping of received audio object depth positions and rendering depth positions.

For example, the 3D display 103 may have a depth rendering range which extends, say, 2 meters in front of the display. An image to be presented may be received with a depth map having depth position values in the range from, say, 0-255 and with the display plane depth corresponding to a value of 128. In this case, the range from 0-128 may accordingly be mapped to the range from the display plane depth/screen level to two meters in front of the screen. Thus, an image object with a depth value of 64 may e.g. be rendered at a position one meter in front of the screen. The indication of the rendering range being from screen level to two meters in front of the screen may be provided to the mapper 109 which may proceed to perform a corresponding mapping of audio sources. For example, if the target depth position (the z-value) for audio objects in front of the display is given by a value in the range of, say, 0-5 meters, the mapper 109 may map the values from 0-5 meters to the range from 0-2 meters in front of the screen. In such an example, some depth compression and limitation may be introduced to the audio objects by the mapper 109. For example, all z-values (relative to the screen level) received for audio objects in the range from 0-2.5 meters may by the mapper 109 be multiplied by 0.8 resulting in them being mapped to the range of 0-2 meters. All audio objects more than 2.5 meters in front of the screen may be limited to a distance of 2 meters. Thus, the range from 0-5 meters is mapped non-linearly to the range of 0 to 2 meters in front of the screen.

The mapper 109 is in the example of FIG. 1 coupled to an audio driver 111 which is arranged to generate drive signals for a set of loudspeakers 113 thereby allowing the received audio objects to be rendered together with the rendering of the 3D video on the 3D display 103. The audio driver 111 thus forms a renderer which is arranged to render the first audio object to be perceived from a position corresponding to the rendering depth position determined by mapping the received target depth position for the first audio object.

The audio driver 111 includes a spatial audio processor and is arranged to generate suitable drive signals to cause audio to be rendered such that it is perceived to originate from the desired positions. The exact functionality and speaker configuration will depend on the preferences and requirements of the individual embodiment, and many different techniques and approaches for spatial audio rendering are known to the skilled person.

As an example, the speakers 113 may form a typical five or seven speaker surround sound set and the audio driver 111 may position audio objects at specific positions (corresponding to the remapped positions) by determining signal value contributions to each surround sound channel using a panning algorithm (e.g. by applying VBAP). Other examples of suitable techniques for spatial rendering may include e.g. Wave Field Synthesis, transaural audio, or ambisonics.

The system of FIG. 1 may provide an improved user experience and specifically may provide improved spatial synchronization between the audio and video for a 3D audiovisual presentation.

In some embodiments, the audio and video processing may be separate and be performed individually. For example, in some embodiments, the audio signal may be a separate audio data stream which does not include any information related to the visual content of an audiovisual content item. Indeed, in many cases, the audio may be provided in accordance with an audio format or standard which relates only to audio content and which does not include video data.

Typically, audio visual content is provided in a transport stream which comprises one or more elementary streams where each elementary stream may typically be a video stream or an audio stream. Indeed, typically each elementary stream includes data for only one type of audio visual content (i.e. either video or audio) and typically an elementary stream can be decoded by a single audio or video decoding process. Each elementary stream is thus generated in accordance with a format or standard that allows it to be decoded by itself and without considering any other elementary streams of the transport stream. Specifically, an audio elementary stream can be decoded by a single audio decoder without considering any other elementary streams. Similarly, a video elementary stream can be decoded by a single video decoder without considering any other elementary streams.

Thus, in many practical systems, each elementary stream is a single content type, separately decodable audio stream. Each elementary stream is furthermore encoded in accordance with a specific audio or video encoding format which is typically a standardized format. Thus, each elementary stream is processed individually by a single standardized format decoder.

An example of a content distribution approach using such an arranged format is the widespread and popular MPEG standards.

In some embodiments, content may be received in the form of a transport stream comprising a plurality of elementary streams as described. An example of such an embodiment is illustrated in FIG. 2 which corresponds to the system of FIG. 1 except for the differences described in the following.

Figure 2:
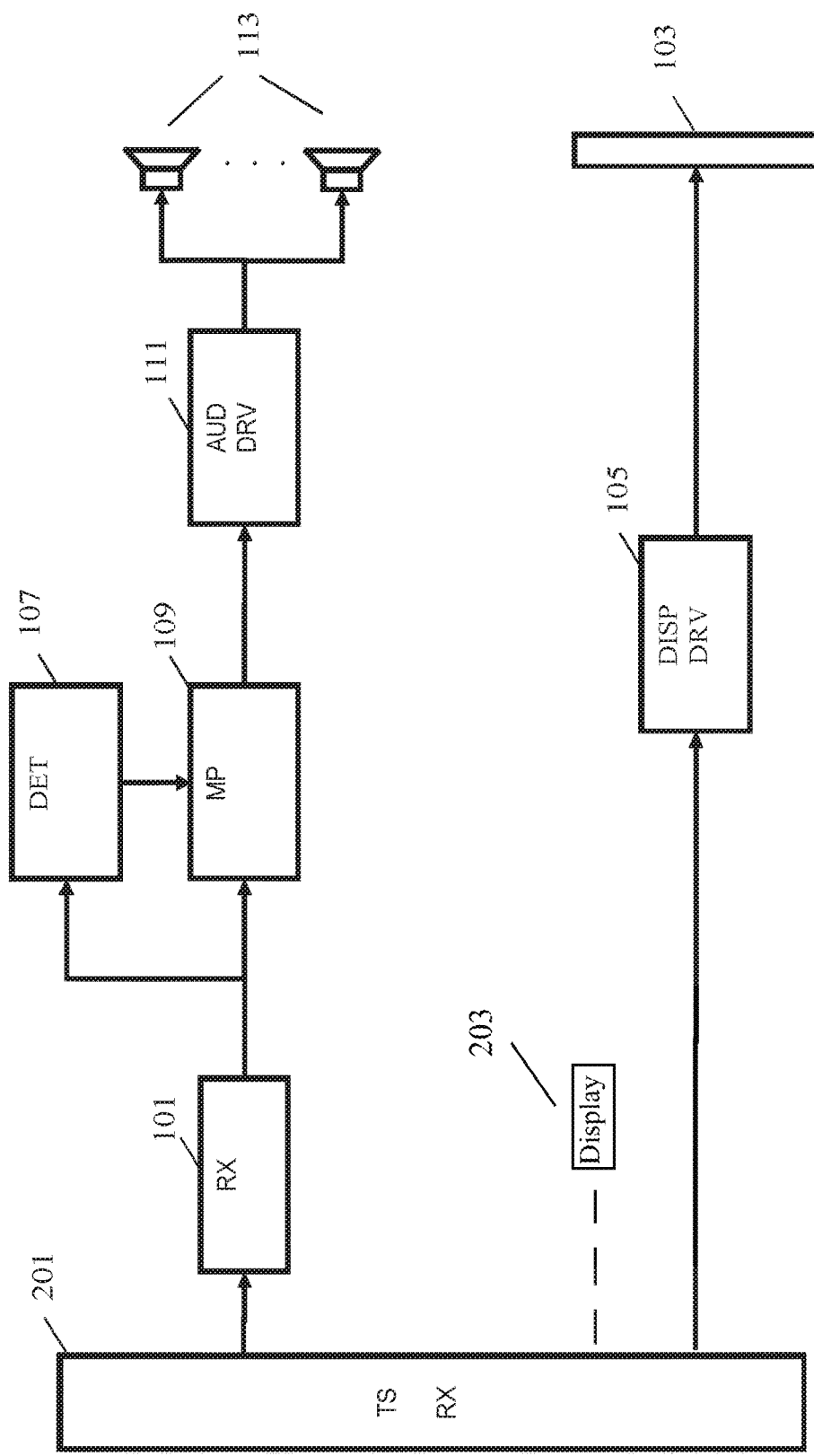
FIG. 2 is an illustration of an example of an audiovisual rendering system comprising an audio signal processing apparatus in accordance with some embodiments of the invention.

In the system of FIG. 2, a transport stream receiver 201 receives a transport stream comprising at least one elementary video stream and one elementary audio stream. The elementary video stream is fed to the display driver 105 where it is decoded by a suitable video decoder and in response to the decoded data the 3D display 103 is driven to present the 3D image. The decoding and processing of the elementary video stream is completely independent of the decoding, processing and rendering of the elementary audio stream.

The elementary audio stream is fed to the audio processor which in the example is an audio decoder. The audio processor accordingly receives an audio data stream. The audio data stream is complete in the sense that it includes all data required for rendering audio components represented by the audio stream. The audio stream furthermore does not include any data necessary for rendering the corresponding 3D image(s)/video. Thus, although the audio of the audio stream is associated with the 3D video being presented on the 3D display 103, it does not contain any video data representing this video.

The audio stream provided to the audio processor comprises at least three different types of data.

Firstly, it comprises audio data for one but typically substantially more audio objects which are associated with a three dimensional image. Thus, the audio objects are intended to be rendered together with the rendering of the 3D video and provide a description of audio of the scene represented by the video.

The audio objects are not audio channel components provided for a specific predetermined or reference position (e.g. left channel, right channel, and center channel) but rather typically correspond to individual sound sources in the scene. In particular, one or more of the audio objects may directly be related to one image object in the 3D image (e.g. a speech audio object may be associated with an image object representing the speaker).

Accordingly, the audio stream may secondly include depth position data indicative of a target depth position for one or more of the audio objects. The target depth position for an audio object relates to a position along an axis (typically referred to as the z-axis) perpendicular to the screen/display plane of the 3D display 103. It will be appreciated that the audio stream may, and typically also will, include position values in the screen plane (i.e. along the x and y directions).

The position data for a given audio object may thus be indicative of the position in the scene of the sound source represented by the audio object.

It will be appreciated that position data need not be included for all audio objects. In particular, some audio objects may not correspond to sound sources that have specific positions, but rather may have diffuse or spread source positions. For example, some audio objects may correspond to ambient or background sound which is not intended to be rendered from specific positions.

Thirdly, the audio stream comprises data comprising an indication of a depth rendering property for the target three dimensional display for the presentation of the 3D image with which the audio is associated. In the specific example, the audio stream accordingly includes data representing a depth rendering property, and specifically a visual rendering depth range, of the 3D display 103. The depth rendering property thus indicates a visual rendering depth range for the display as previously described.

Thus, in the signal an audio signal/stream is received which comprises:
audio data for at least a first audio object associated with a three dimensional image,
depth position data indicative of a target depth position for the first audio object, and
display data comprising a depth rendering property for a target three dimensional display for presenting the three dimensional image.

Figure 3:
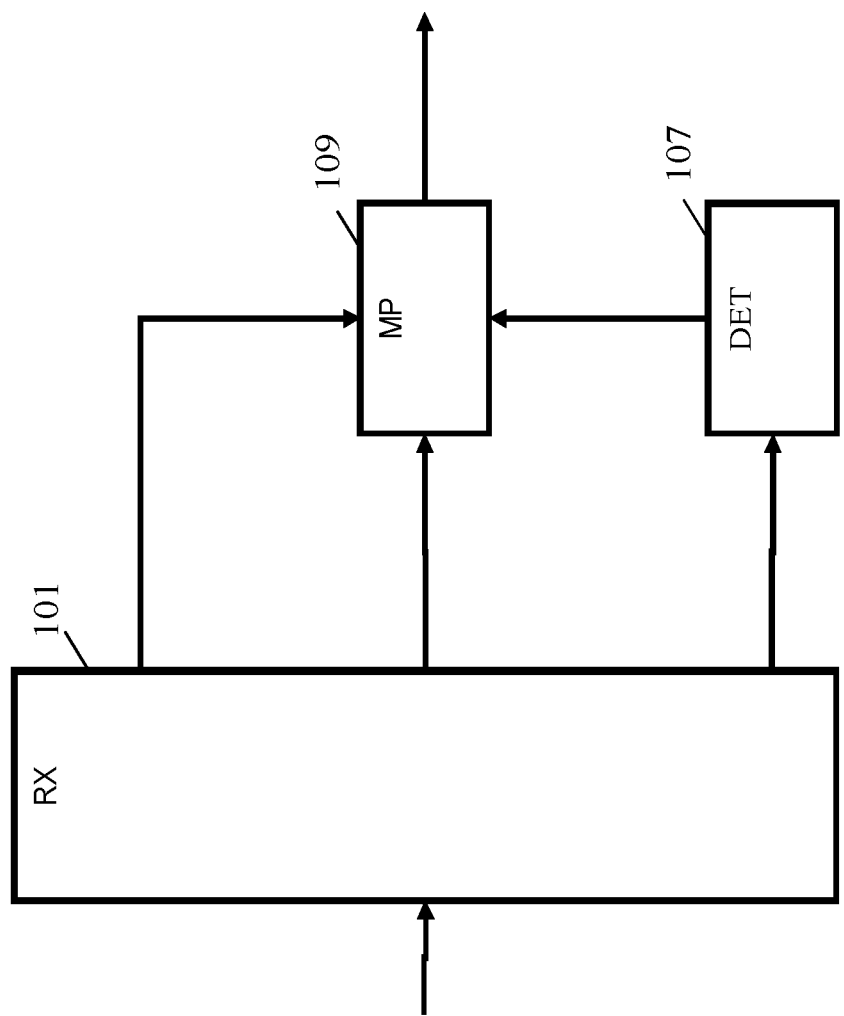
FIG. 3 is an illustration of an example of an audio signal processing apparatus in accordance with some embodiments of the invention.

As illustrated in FIG. 3, the audio processor of FIG. 2 may accordingly comprise a receiver 101 which receives an audio stream comprising audio data for audio objects, position data for the audio objects, and display data indicating a depth rendering property for a target display.

The depth rendering property is determined from the display data by the display property determiner 107 and fed to the mapper 109 which also receives the audio object data and the position data. The mapper 109 then performs mapping of the depth position based on the depth rendering property, and specifically on the visual rendering depth range.

In the system of FIG. 2, the depth rendering property is accordingly not provided by direct interaction between the audio processor and the display or video functionality. Rather, the only input needed to the audio processor is the audio stream itself. The audio stream may be provided in accordance with a suitable audio format and thus can be a generic or standard audio processor or decoder which can operate in accordance with the audio format. The same generic audio processor can accordingly be used in a variety of different applications and systems without requiring it to be customized or specifically adapted or designed for the individual implementation.

The data indicating the depth rendering property may in some embodiments be inserted into the audio stream by the transport stream receiver 201. Specifically, the display driver 105 may feed relevant data to the transport stream receiver 201 describing the depth rendering characteristics of the 3D display 103 and the transport stream receiver 201 may insert this data into the appropriate fields of the audio stream. In other embodiments, the depth rendering property may be provided to the audio processor directly via a separate local interface without the transport stream receiver 201 (or any other processor) modifying the audio signal. Thus, in many embodiments, the received audio stream (e.g. an MPEG-H elementary stream) may directly be fed to the audio processor. However, in such embodiments, the local interface may e.g. use a format corresponding to MPEG-H to provide the information of the depth rendering property.

In the system of FIG. 2, the display property determiner 107 is arranged to extract the display data from the audio stream and to determine the depth rendering property in response to the display data. For example, it may extract the relevant data fields of the audio stream which describe the visual rendering depth range for the target display (which in the specific example is the 3D display 103) and feed this to the mapper 109.

The mapper 109 then uses this information to determine a mapping from input depth positions to output depth positions, and specifically uses the visual rendering depth range to determine a function for calculating an output depth position from an input depth position. Thus, the mapper 109 is arranged to adapt the mapping in response to the visual rendering depth range. The determined mapping is then applied to the received target depth positions for the audio objects in order to determine a modified depth position. It will be appreciated that in some embodiments the received target depth positions may be modified (e.g. by a user) prior to mapping. Similarly, in some embodiments the resulting rendering positions may be modified (e.g. by a user) prior to rendering.

It will be appreciated that the mapping may take other parameters into account and specifically may in some scenarios also be dependent on e.g. a position in the screen plane (and specifically on an azimuth or elevation position of an image object corresponding to the audio object).

In many embodiments, the mapping may only be applied to a subset of the received audio objects and specifically the audio stream may include information describing whether an individual audio object should be remapped or not. The remapping may typically be limited to audio objects that are related to an object in the scene, and typically to an image object in the 3D image.

In many embodiments, the audio stream may include a flag for each audio object indicating whether it relates to a visual object in the three dimensional image or not. If so, the depth position for the audio object will be remapped and otherwise the original depth position will be used.

In some embodiments, a flag may only be provided for one or some of the audio objects but in other embodiments a flag may be provided for all audio objects. The flag for an audio object may indicate whether the audio object is screen related object or not. A screen related audio object is an audio object for which a rendering process is dependent on a property of the three dimensional display. Thus, the audio objects of the signal may be classified or designated as being either screen related audio objects or non-screen related audio objects. For the audio objects designated as being screen related, the audio rendering is adapted in response to one or more properties of the 3D display when rendering the 3D image. Thus, for these objects, the audio rendering is adapted based on a depth rendering property of the display, and specifically the mapping based on the visual rendering depth range is applied to such objects. However, the mapping is not applied to audio objects that are designated as being non-screen related audio objects.

Thus, the mapper 109 may be arranged to perform the mapping in response to the flag and specifically it may be arranged to only apply the mapping to an audio object if the flag indicates that this is indeed a screen related audio object. Thus, if the flag indicates that the audio object is a screen related object then the position is mapped before the audio rendering and otherwise the position may be used directly without any mapping being applied.

The flag may essentially in many embodiments indicate whether the audio object is associated with something visible in the 3D image or not. Setting this flag may be used as a highest-level prerequisite for allowing any screen-related processing to be applied to the audio object, including 2D remapping based on the size of the display, remapping for zooming, or the described depth remapping based on the depth rendering properties of the display.

The flag would be set at the content creation side and is a part of the transmitted bitstream, and specifically of the received elementary audio stream.

For example, in MPEG-H, a single flag (the "bsIsScreenRelativeObject"), can be used to distinguish between objects that are candidates for the various types of screen-related processing, and objects to which no such processing should be applied. The specific type of screen-related processing that is applied to the audio objects for which the flag is set may depend on the presence of relevant metadata for the specific individual processes. Specifically, the described depth remapping may be applied if information on the depth rendering property of the local display is available.

As a specific example, the audio stream may be an MPEH-H 3D audio stream modified to include depth rendering property information.

Thus, specifically, in some embodiments the approach may be implemented by building on the existing mechanism in MPEG-H 3D Audio for remapping of azimuth and elevation data for so-called "screen-related" objects. Specifically, the approach may be implemented re-using some already existing MPEG-H 3D Audio metadata items. As a specific example:

Information describing whether an audio object is a candidate for remapping may be implemented as the existing flag "isScreenRelativeObject" in the MPEG-H 3D Audio Audio Object Metadata (OAM).

Information describing the depth rendering property may be implemented as an extension of the existing MPEG-H 3D Audio local setup information element LocalScreenSizeInformation ( )" with e.g. new fields:

bsLocalScreenDepth, providing an overall indication of the local screen depth range, e.g. in terms of meters, or bsLocalScreenDepthFront and/or bsLocalScreenDepthBack, for specifying separately the depth range of visual objects in front- and behind the local screen.

Furthermore, in such an MPEG-H 3D Audio context based example, the depth position (the audio object distance parameter) that is transformed by the mapping function may correspond to the existing audio object position data field position_radius [ ].

It will be appreciated that the description of the depth rendering property may follow this format both in embodiments wherein the information is included in the audio stream as well as in embodiments wherein the information is provided via an alternative direct local interface.

In some embodiments, the audio stream may also comprise an indication of a depth rendering property for a second display 203, which will be referred to as the reference display, for the three dimensional image. The reference display may e.g. be the specific display that was used for the production of the 3D image/video or may e.g. be a nominal or standard display which e.g. may be expected to be used for the rendering of the 3D image/video.

The display property determiner 107 may extract this reference rendering property and then adapt the mapping dependent thereon.

Thus, in some embodiments, the mapping may be dependent on both the depth rendering property of the 3D display 103 as wells as a reference depth rendering property for the received 3D image. In other embodiments, the mapping may only take into account the depth rendering property of the 3D display 103. Such an approach may in particular be suitable for scenarios where the original production screen is a 2D screen.

In particular, the audio stream may include an optional indication of the distance/depth range of the screen that was used during production of the content, e.g. either signaled explicitly or as a flag that signals a default reference distance/depth range. The optional indication may e.g. be an overall indication of the production screen depth range, e.g. in terms of meters, or may separately specify the depth range of visual objects in front- and/or behind the production screen.

As a specific example, the indication may be implemented as an extension of the existing MPEG-H 3D Audio metadata audio element "mae_ProductionScreenSizeData ( )" with e.g. new fields:

hasNonStandardScreenDepth, to signal that a production display depth difference from the default reference screen depth is signaled, bsScreenDepth, providing an overall indication of the production display depth range, e.g. in terms of meters, or bsScreenDepthFront and/or bsScreenDepthBack, for specifying separately the depth range of visual objects in front- and behind the production display.

Thus, in many embodiments an audio signal may be used which comprises:

audio data for at least a first audio object representing audio for an image object of a three dimensional image, depth position data indicative of a target depth position for the first audio object, a flag for at least one audio object (possibly the first audio object) indicating whether a position of the at least one audio object corresponds to a visible object in the three dimensional image or not; and display data comprising a depth rendering property for a reference three dimensional display for the three dimensional image, the depth rendering property indicating a visual rendering depth range of the three dimensional display.

For example, an MPEG-H audio bitstream may comprise a flag that indicates whether the object is screen-related and metadata describing the reference screen. These features may be metadata elements that are defined at the content creation side.

However, whereas it is possible for the audio stream to also include metadata describing the target three dimensional display (the 3D display 103) e.g. inserted by the transport stream receiver 201, this information is typically in many embodiments provided separately and externally to the audio processor and not as part of the audio stream. Specifically, as illustrated in FIG. 1, the data may be provided directly from other elements of the rendering system rather than being included in the audio stream.

Thus, metadata describing the local setup, e.g. the information on local screen size, user-defined zoom area, the display depth rendering property etc. may directly be fed to the audio process (which may specifically be an MPEG-H decoder) via a separate local interface. The syntax for the local interface and the metadata elements used on this local interface may however follow a standardized approach thereby facilitating interworking between different entities.

It will be appreciated that the specific mapping used, and the way this depends on the depth rendering property may vary between different embodiments in order to reflect the specific preferences and requirements of the individual application.

In many embodiments, the mapping may be a monotonic mapping of a rendering depth range for the reference display to a rendering depth range for the target three dimensional display. Indeed, the mapping may be adapted to be a linear function which depends on the ratio between the reference display depth range and the 3D display 103 depth range, i.e. between a signaled production display depth range and a local screen depth range.

E.g. if the audio stream includes data indicating that the 3D image was generated using a display with a depth range in front of the screen being up to 3 meters whereas the depth rendering property indicates that the depth range for the 3D display 103 is only, say, 1.5 meters, the mapping may be adjusted to correspond to a multiplication of the distance from the z-position to the screen by a factor of 1.5/3=0.5. If instead the depth rendering property indicates that the depth range of the 3D display 103 is, say, 2 meters, the mapping factor would be 2/3=0.67.

Thus, in many embodiments, the depth rendering property may be an indication of the depth rendering range that can be provided by the 3D display 103. This may provide a particularly advantageous user experience and specifically may in many scenarios provide an improved spatial synchronization between the presented audio and video.

As an example, the mapping may include limiting the audio object depth value such that the audio object will always be rendered within the limits of the visual depth range of the local screen, where audio objects with original depth positions outside this range are rendered at the limit of this range.

In many embodiments, the mapping may advantageously be asymmetric around a display depth. The mapping may in some embodiments be different for positions in front of the display and for positions behind the display, i.e. mapping functions in front- and behind the screen may be different.

The inventor has realized that an asymmetric mapping may provide an improved user experience and perceived closer spatial synchronization. This may reflect that the depth range in front of the screen is typically substantially more perceptually sensitive and that displays typically are not as efficient at rendering large depth deviations without perceived degradation when the object is in front of the screen compared to when it is behind the screen.

In many embodiments, the depth rendering property may be a depth rendering range and this may be different for objects in front of the screen and for objects behind the screen. For example, the depth rendering property may indicate that the available depth rendering range in front of the screen is, say, 3 meters and that it behind the screen is, say, 20 meters.

The mapping may then determine a different mapping for objects in front of the screen than for objects behind the screen. For example, individual mapping factors may be determined for objects in front of and behind the screen.

In many embodiments, the mapping may be arranged to only modify depth values in front of the display but to not modify the depth values behind a display/screen plane.

Thus, in some embodiments, the mapping may only change the depth values of objects in front of the screen. This may correspond to a corresponding asymmetrical depth mapping being applied to the 3D video image. A reason for applying such asymmetrical mapping to the 3D video image may be that unwanted effects of visual discomfort and fatigue mainly occur for image objects in front of the display, because of the negative disparity properties of such image objects (forcing the eyes to "cross").

However, the asymmetrical mapping may also be applied only to the audio objects. This would allow full spatial synchronization between the audio objects and corresponding image objects in front of the screen, where such synchronization is most critical, while maintaining the possibility to have "distant" audio objects behind the display, even if the corresponding image objects are being remapped to be closer to the display plane.

In many embodiments, the mapping may be a non-linear mapping.

For example, audio objects with target distances beyond the physical depth range of the display may be treated differently from those that are within the display depth range. E.g. depth positions for the former category of objects may be clipped to the limits of the display depth range, while depth positions of audio objects within the display depth range remain unchanged. As another example, a non-linear compression curve may be applied to the depth positions, in such a way that depth positions further away from the display (either in front or behind it) are more heavily compressed towards the display plane than the depth positions of objects closer to the display. An example of such a non-linear compression curve may be a curve that applies no compression to the depth position of audio objects close to the display, and causes the depth position to asymptotically increase towards the limit of the display depth range for audio objects at increasing distance from the screen.

Again, this non-linear mapping may correspond to a corresponding non-linear mapping being applied to the 3D image.

In some embodiments, the mapping is a perceptually weighted mapping. Specifically, in some embodiments, the mapping may be determined based on a perceptual model for human depth vision. The model may reflect how a viewer's depth perception will be dependent on the depth rendering property of the 3D display 103. Such an approach may provide an improved user experience with, in particular, a closer perceived spatial synchronization.

Many 3D displays, such as specifically 3D televisions, comprise functionality for generating 3D video content from received 2D video. Indeed, it will be appreciated that many different algorithms and techniques will be known to the skilled person for performing a 2D-to-3D video conversion process. For example, techniques considering relative motions and parallaxes of different image objects are known.

In some embodiments, the system may comprise a converter for generating the three dimensional image from two dimensional images, i.e. for performing a 2D-to-3D conversion. The conversion includes generating a depth map which comprises depth values for e.g. different image objects or pixels. Indeed, the conversion may use an existing algorithm which as part of the conversion generates a depth map reflecting the estimated depth values.

In some embodiments, the display property determiner 107 may be arranged to determine the depth rendering property in response to the values of such a depth map. As a specific example, the display property determiner 107 may determine the depth rendering property as the depth range of the depth map, i.e. it may determine this as the range from the highest to the lowest value. The depth values may in some embodiments be used directly as relative values or may be converted to specific physical distances by a conversion that takes into account known physical rendering characteristics of the display.

The depth map information may for example be used to set the limit values of the mapping to correspond to the extreme values of the depth map.

This approach may provide an efficient system where improved spatial synchronicity can be achieved while reusing some functionality that is already being used for other purposes. In particular, the approach may exploit that a local generation of a depth map in a display typically takes into account depth rendering properties of a display and that a consideration of the resulting depth map accordingly may provide an efficient way of controlling the mapping of the z-position of sound objects.

In some embodiments, the audiovisual rendering system comprises functionality for the 3D image, or more generally the 3D scene as such (in case information on this beyond that represented by the 3D image is available), being presented to be zoomed, i.e. rather than necessarily presenting the entire 3D image, a subset of the image may be selected and presented on the 3D display 103. Thus, only a subset of the image is selected to be visible when presented on the 3D display 103.

Figure 4:
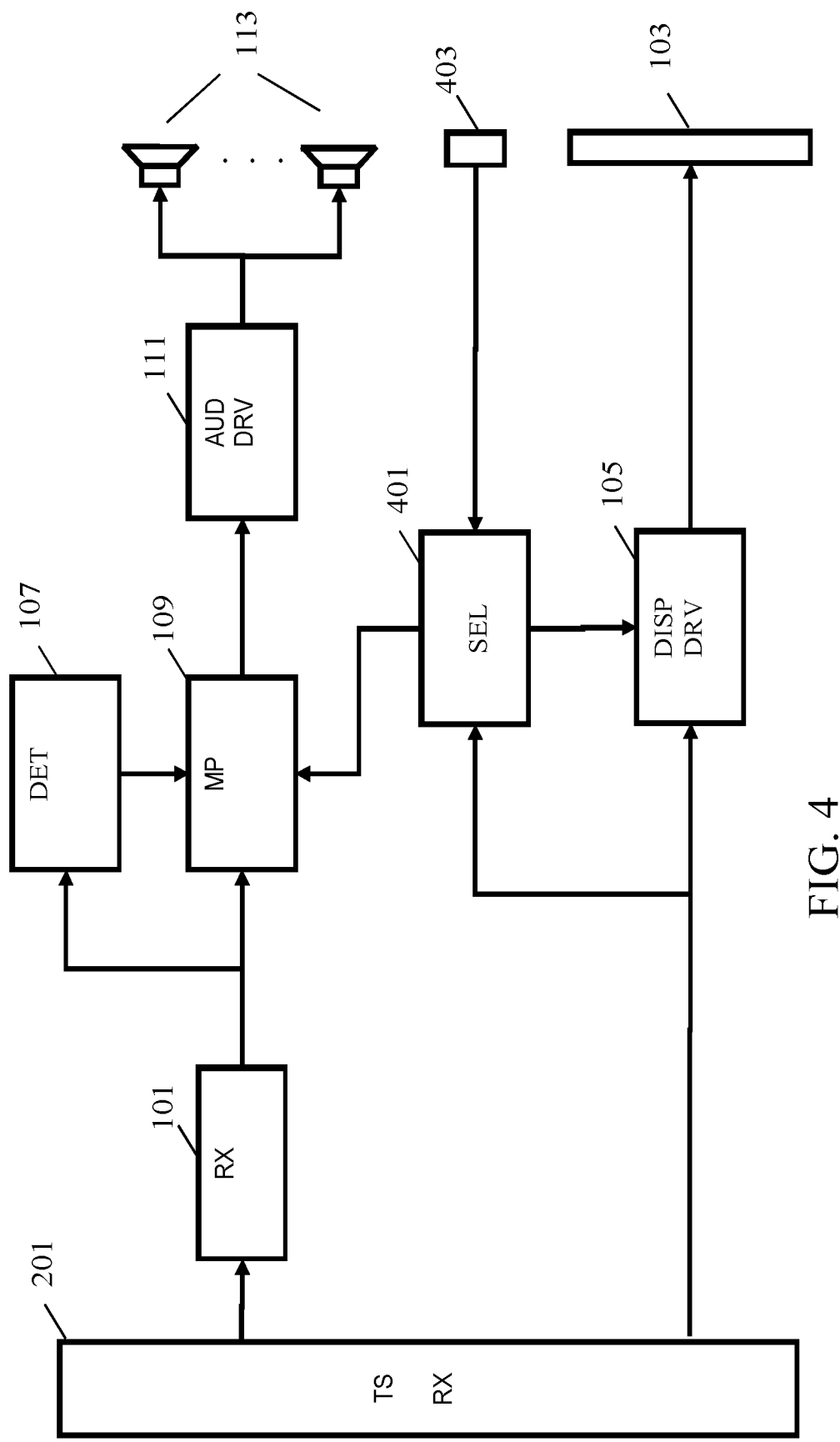
FIG. 4 is an illustration of an example of an audiovisual rendering system comprising an audio signal processing apparatus in accordance with some embodiments of the invention.

FIG. 4 illustrates an example of such a system. The example corresponds to the system of FIG. 2 but additionally includes a selector 401 which is arranged to select a subset of the 3D image(s) for presentation on a full display area of the 3D display 103. The selector 401 may specifically be arranged to select the subset in response to a user input which e.g. may be provided via a user interface 403. For example, the user interface 403 may interface with the user to allow the user to select one of a predetermined number of subareas or volumes of the presented full 3D image.

The selector 401 is coupled to the display driver 105 which is fed the subset selection and which in response selects the corresponding part of the 3D image and presents this on the full available screen area of the 3D display 103.

The selector 401 further receives depth information for the 3D image (such as e.g. a depth map) and is arranged to determine a depth property for the specific subset of the 3D image which is selected for presentation. Specifically, it may represent the depth range which is spanned by the specific selected subset. For example, if the total range is given by z-values in the range of [0, 1023] but the only z-values within the selected subset are in the range of, say, [612, 784], the depth property may be determined as this range. The range may then be converted to an actual physical range by the mapper 109 using information of the depth rendering range of the 3d display 103.

In the system, the mapper 109 is arranged to adapt the mapping in response to a depth property for the subset. For example, it may adapt the audio object position mapping such that the rendering range for the selected subset is mapped to the entire available depth rendering range for the 3D display 103. Such an approach may thus reflect that a zooming of the image not only affects the size of objects in the x and y directions but also affects the depth positions of image objects. The approach may accordingly provide an improved spatial synchronicity that can be better maintained even if image zooming is supported.

The approach may provide substantially improved performance in many applications which are of increasing importance and interest. For example, user interactivity is an increasingly important element in many virtual reality and augmented reality multi-media applications. In such applications, users are able to navigate through a virtual or augmented audio-visual scene, and are also able to actively manipulate the scene. Besides rotation and translation of the user's viewpoint, such manipulation may also include zooming into a specific region of interest.

Related examples of such zooming interactivity can currently be found for example in MPEG-DASH's "Spatial Relationship Descriptor (SRD)" feature, and also in MPEG-H 3D Audio (3DA).

In SRD, a high-resolution visual scene (e.g. footage of a football game) is composed of a large number of tiles, and a user is able to zoom into a part of the scene (e.g. the part of the field where the ball currently is). In this case, the selected zoom area (tile) is "exploded" to fill the entire screen. In SRD there is also the possibility of specifying a spatial relationship between spatial regions of the visual scene (tiles) and audio objects. When the user zooms into a selected area, these spatial relationships may be used adapt the azimuth and elevation for audio reproduction to reflect the zoomed perspective.

In 3DA, a similar mechanism is provided that enables the user to zoom into an audio-visual scene containing audio objects that are related to what the user sees on the screen. By selecting a zoom area, the selected video area is expanded to fill the entire screen, and positions of audio objects contained in the zoomed area are remapped to also fill the screen area, i.e. the x and y positions may be changed.

However, these approaches are based on and developed for low complexity 2D applications and do not consider depth zooming. Depth zooming is particularly difficult as it (in contrast to traditional 2D zooming which is just dependent on the display size) is highly dependent on the specific characteristics of the individual 3D display. The system of FIG. 4 may however support such visual depth zooming while still maintaining a high degree of spatial synchronicity.

Indeed, the mapper 109 of FIG. 1 is arranged to map the positions differently for the visual rendering depth range indicating a first visual depth rendering range for a three dimensional display having a given display size and for the visual rendering depth range indicating a second, different visual depth rendering range for the same display size. Also, the mapper 109 of FIG. 1 may be arranged to apply the same mapping for the same indication of visual rendering depth range being provided for different display sizes.

Thus, the approach is not merely a display size dependent adjustment of the audio but provides an adaptation of the mapping to the specific capabilities of the display when rendering depth. Such rendering capabilities may be partly dependent on the display size but further depend on many other parameters and properties. Thus, displays of different sizes may have the same depth rendering capability, or displays of the same size may have different depth rendering capabilities. This may be reflected by the mapping of the mapper 109 and thus an improved adaptation of the rendered audio to the specific display characteristics can be achieved.

In many embodiments, the mapper 109 may be arranged to adapt the mapping to be a monotonic mapping of the depth range represented in the selected subset to a rendering depth range for the target three dimensional display, i.e. for the 3D display 103. As previously mentioned, the depth range may be determined by the selector 401 and the mapper may relate this to the depth rendering property of the 3D display 103 and modify the mapping of audio objects to correspond to a mapping of the depth range for the subset to the entire depth range of the 3D display 103. It will be appreciated that in some embodiments, the mapping may only be applied to a subset of the range (of both the subset and the rendering range of the 3D display 103). For example, only values for objects in front of the screen may be mapped.

The mapping may specifically be applied to audio objects that correspond to positions within the selected subset. Thus, audio sources associated with the selected visual subset may be remapped to positions that reflect the rendering position of these positions when the zoom is applied. Specifically, if an audio object is linked to a specific image object which is within the selected subset, the audio object may be mapped to a position that corresponds to the position of this image object when the zoomed view is rendered.

However, in many embodiments, the mapping may alternatively or additionally be applied to audio objects having a position which is outside the selected subset. Thus, the mapping is not only applied to audio sources corresponding to the visible selection but also to other audio objects.

In such embodiments, audio objects that are located outside the zoomed subset, or that are not indicated as being video-related, may be rendered such that their rendered positions are adapted relative to the zoomed subset. For example, an object that in the unzoomed scene is between the viewpoint of the user and the selected subset, may in the zoomed rendering be rendered as being behind the user.

In some embodiments, the mapping may alternatively or additionally be applied to audio objects that are not linked with the specific properties in the video, such as e.g. ambient or background sounds. However, in many embodiments, audio ambience components (reverberation, crowd noises, etc) will be rendered unadapted, i.e. the same as in the unzoomed scene, possibly with only a rotation if the user also rotates the zoomed area.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An audio signal processing apparatus, comprising:
   a receiver,
      wherein the receiver is arrange to receive an audio signal,
      wherein the audio signal comprises audio data for at least a first audio object,
      wherein the first audio object represents an audio source in a scene visually represented by a three dimensional image including right and left eye views,
      wherein the audio signal comprises depth position data indicative of a first depth position for the first audio object;
   a determiner,
      wherein the determiner is arranged to determine a depth rendering property for a first three dimensional display for presenting the three dimensional image,
      wherein the first three dimensional display includes a display screen, and wherein the depth rendering property indicates a visual rendering depth range of the first three dimensional display; and
   a mapper, wherein the mapper is arranged to map the first depth position to a rendering depth position for the first audio object,
   wherein the mapping is dependent on the visual rendering depth range,
   wherein the mapping is asymmetrically applied to the first audio object around a screen depth level without asymmetrically mapping an image object corresponding to the first audio object,
   wherein the screen depth level corresponds to a zero disparity between display positions in the three dimensional image for the right and left eye views, such that a first mapping function applied to the first audio object when the first depth position of the first audio object is in front of the screen is different than a second mapping function applied to the first audio object when the first depth position of the first audio object is in behind the screen.

2. The audio signal processing apparatus of claim 1,
   wherein the audio signal further comprises an indication of a depth rendering property for a reference display for the three dimensional image; and
   wherein the mapper is arranged to adapt the mapping in response to the depth rendering property for the reference display.

3. The audio signal processing apparatus of claim 2, wherein the mapping is a monotonic mapping of a visual rendering depth range for the reference display to the visual rendering depth range for the first three dimensional display.

4. The audio signal processing apparatus of claim 1,
   wherein the mapper is arranged to map the first depth position differently for the visual rendering depth range indicating a first visual rendering depth range for the first three dimensional display having a first display size and for the visual rendering depth range indicating a second visual rendering depth range for the first three dimensional display having the first display size,
   wherein the first visual rendering depth range is different from the second visual rendering depth range.

5. The audio signal processing apparatus of claim 1, wherein the mapping is a non-linear mapping.

6. The audio signal processing apparatus of claim 1,
   wherein the audio signal includes a flag for the first audio object indicating whether the audio object is a screen related audio object or not,
   wherein the screen related audio object is an audio object for which a rendering process is dependent on a visual rendering property of the first three dimensional display, and
   wherein the mapper is arranged to apply the mapping to the first depth position of the first audio object only if the flag indicates that the at least one audio object is a screen related audio object.

7. The audio signal processing apparatus of claim 1, further comprising a converter,
   wherein the converter is arranged to generate the three dimensional image from a plurality of two dimensional images,
   wherein generating of the three dimensional image comprising determining a depth map for the three dimensional image, and
   wherein the determiner is arranged to determine the depth rendering property in response to the depth map.

8. The audio signal processing apparatus of claim 1,
   wherein the audio signal further comprises display data indicative of the depth rendering property, and
   wherein the determiner is arranged to extract the display data and determine the depth rendering property in response to the display data.

9. The audio signal processing apparatus of claim 1, further comprising a selector arranged to select a subset of a three dimensional scene represented by the three dimensional image for presentation on a full display area of the first three dimensional display wherein the mapper is arranged to adapt the mapping in response to a depth property of the subset.

10. The audio signal processing apparatus of claim 9, wherein the mapper is arranged to adapt the mapping to be a monotonic mapping of a visual rendering depth range of the subset to a rendering depth range for the first three dimensional display.

11. The audio signal processing apparatus of claim 10, wherein the first depth position for the first audio object is outside the subset.

12. A method of processing an audio signal, the method comprising acts of:
   receiving an audio signal comprising audio data for at least a first audio object, wherein the at least first audio object represents an audio source in a scene visually represented by a three dimensional image including right and left eye views,
wherein the audio signal comprises depth position data indicative of a first depth position for the first audio object;
determining a depth rendering property for a first three dimensional display for presenting the three dimensional image,
wherein the first three dimensional display includes a display screen, and
wherein the depth rendering property indicates a visual rendering depth range of the first three dimensional display; and
mapping the first depth position to a rendering depth position for the first audio object; wherein the mapping is dependent on the visual rendering depth range,
wherein the mapping act is asymmetrically applied to the first audio object around a screen depth level without asymmetrically mapping an image object corresponding to the first audio object,
wherein the screen depth level corresponds to a zero disparity between display positions in the three dimensional image for the right and left eye views, such that a first mapping function applied to the first audio object when the first depth position of the first audio object is in front of the screen is different than a second mapping function applied to the first audio object when the first depth position of the first audio object is in behind the screen.

13. The method of claim 12,
wherein the audio signal includes a flag for the first audio object indicating whether the audio object is a screen related audio object or not,
wherein the screen related audio object is an audio object for which a rendering process is dependent on a visual rendering property of the first three dimensional display; and wherein the mapping is performed only when the flag indicates that the at least one audio object is a screen related audio object.

14. The method of claim 12, further comprising generating the three dimensional image from a plurality of two dimensional images, generating the three dimensional image includes determining a depth map for the three dimensional image, wherein determining the depth rendering property is performed in response to the depth map.

15. The method of claim 12,
wherein the audio signal further comprises display data indicative of the depth rendering property; and
wherein determining the depth rendering property includes extracting the display data and determining the depth rendering property in response to the display data.

16. The method of claim 12, further comprising:
selecting a subset of a three dimensional scene represented by the three dimensional image for presentation on a full display area of the first three dimensional display; and
adapting the mapping in response to a depth property of the subset.

17. A non-transitory computer readable storage-medium comprising computer instructions which, when executed by an audio signal processing apparatus, configure the audio signal processing apparatus to:
receive an audio signal comprising audio data for at least a first audio object,
wherein the at least first audio object represents an audio source in a scene visually represented by a three dimensional image including right and left eye views,
wherein the audio signal further comprising depth position data indicative of a first depth position for the first audio object;
determine a depth rendering property for a first three dimensional display for presenting the three dimensional image,
wherein the first three dimensional display includes a display screen, and
wherein the depth rendering property indicates a visual rendering depth range of the first three dimensional display; and
map the first depth position to a rendering depth position for the first audio object, wherein the mapping is dependent on the visual rendering depth range,
wherein the mapping is asymmetrically applied to the first audio object around a screen depth level without asymmetrically mapping an image object corresponding to the first audio object,
wherein the screen depth level corresponds to a zero disparity between display positions in the three dimensional image for the right and left eye views, such that a first mapping function applied to the first audio object when the first depth position of the first audio object is in front of the screen is different than a second mapping function applied to the first audio object when the first depth position of the first audio object is in behind the screen.

* * * * *